US010721791B1

(12) United States Patent
Gamliel et al.

(10) Patent No.: US 10,721,791 B1
(45) Date of Patent: Jul. 21, 2020

(54) RECOMMENDING THE REFACTORING OF MICROSERVICES

(71) Applicant: EMC IP Holding Company LLC, Hopkinton, MA (US)

(72) Inventors: Roi Gamliel, Tkuma (IL); Amihai Savir, Sansana (IL); Avitan Gefen, Lehavim (IL)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 0 days.

(21) Appl. No.: 16/386,524

(22) Filed: Apr. 17, 2019

(51) Int. Cl.
| | |
|---|---|
| G06F 9/44 | (2018.01) |
| H04W 76/36 | (2018.01) |
| G06F 8/72 | (2018.01) |
| H04W 28/02 | (2009.01) |
| G06F 8/41 | (2018.01) |
| G06F 9/50 | (2006.01) |
| H04W 48/06 | (2009.01) |
| H04W 72/12 | (2009.01) |
| H04W 28/16 | (2009.01) |
| H04L 12/26 | (2006.01) |

(52) U.S. Cl.
CPC ............ *H04W 76/36* (2018.02); *G06F 8/433* (2013.01); *G06F 8/72* (2013.01); *G06F 9/5033* (2013.01); *H04W 28/0231* (2013.01); *H04W 48/06* (2013.01); *H04W 72/1226* (2013.01); *G06F 9/5066* (2013.01); *H04L 43/0876* (2013.01); *H04W 28/16* (2013.01)

(58) Field of Classification Search
CPC .......... G06F 16/24578; G06F 16/9024; G06F 8/443; G06F 9/5044; G06F 11/302; G06F 9/5033; G06F 9/5066; H04L 45/44; H04W 72/10; H04W 76/36; H04W 28/0231; H04W 72/1226; H04W 28/16
See application file for complete search history.

(56) References Cited

U.S. PATENT DOCUMENTS

| | | | | |
|---|---|---|---|---|
| 9,292,350 | B1 * | 3/2016 | Pendharkar | ........... G06F 9/5044 |
| 10,198,250 | B1 * | 2/2019 | Sharma | ............... G06F 16/9024 |
| 2003/0226133 | A1 * | 12/2003 | Grover | .................... G06F 8/443 |
| | | | | 717/140 |
| 2018/0136931 | A1 * | 5/2018 | Hendrich | ............... G06F 11/302 |
| 2019/0339965 | A1 * | 11/2019 | Garvey | ............ G06F 16/24578 |
| 2020/0068440 | A1 * | 2/2020 | Talbert | ................. H04W 72/10 |

* cited by examiner

*Primary Examiner* — Tuan A Vu
(74) *Attorney, Agent, or Firm* — Dergosits & Noah LLP; Todd A. Noah (57) ABSTRACT

A system recommends the refactoring of microservices. The system generates a graph of connected nodes including a first node, which represents a first atomic part of code in a microservice in an application, and a second node, which represents a second atomic part of code in the microservice. The system determines a nodes connection score based on any connections between the first node and the second node. If the nodes connection score satisfies a nodes connection threshold, the system determines a relative code size based on comparing a size associated with the first atomic part of code against a size of the microservice. If the relative code size satisfies a code size threshold, the system outputs a recommendation to disconnect the first atomic part of code from the microservice, create another microservice in the application, and connect the first atomic part of code to the other microservice.

20 Claims, 7 Drawing Sheets

RECOMMENDING THE REFACTORING OF MICROSERVICES

BACKGROUND

Microservices are a software development technique, and a variant of the service-oriented architecture style that structures a software application as a collection of loosely coupled services. In a microservices architecture, the loosely coupled services are fine-grained services and their communication protocols are lightweight. Decomposing an application into smaller services improves modularity, which makes the application easier to understand, develop, and test. This application decomposition parallelizes development by enabling small autonomous teams to develop, deploy, and scale their respective services independently.

Whether a software developer is building a new product or decomposing an existing monolithic application, one of the most difficult problems in adopting a microservices architecture is defining the granularity of each microservice. Defining the correct boundaries, both from the business and the technological aspect, is an error prone process that is extremely difficult to accomplish correctly. This tedious and iterative process can require significant amounts of time and money. As much as a microservices architecture allows agility and quick response to business needs, an evolving microservices architecture requires rethinking, changing the boundaries of existing components, and a process known as refactoring.

Refactoring is the process of restructuring existing computer code—changing the factoring—without changing the computer code's external behavior. Refactoring is intended to improve non-functional attributes of the computer code. Advantages of refactoring include reduced complexity and improved source-code maintainability. Typically, refactoring applies a series of standardized basic micro-refactorings, each of which is usually a tiny change in a computer program's source code that either preserves the behavior of the computer code, or at least does not modify the source code's conformance to functional requirements. Many software development environments provide automated support for performing the mechanical aspects of these basic refactorings. If done well, the refactoring of computer code may help software developers discover and correct hidden bugs or vulnerabilities by simplifying the underlying logic and eliminating unnecessary levels of complexity.

Moreover, when a developer wants to introduce a new concept into an existing system composed of several microservices, the developer needs to decide how to divide the new concept to different parts appropriate for each of the current microservices or conduct a refactoring of the system. The refactoring can generate new microservices which will include computer code for the new concept.

DETAILED DESCRIPTION

Embodiments herein recommend the refactoring of microservices. A system generates a graph of connected nodes including a first node, which represents a first atomic part of code in a microservice in an application, and a second node, which represents a second atomic part of code in the micro service. The system determines a nodes connection score based on any connections between the first node and the second node. If the nodes connection score satisfies a nodes connection threshold, the system determines a relative code size based on comparing a size associated with the first atomic part of code against a size of the micro service. If the relative code size satisfies a code size threshold, the system outputs a recommendation to disconnect the first atomic part of code from the microservice, create another microservice in the application, and connect the first atomic part of code to the other microservice.

For example, a refactoring recommendation tool uses unified modeling language to generate a graph of connected nodes which include nodes that represent an atomic part A of code, an atomic part B of code, an atomic part C of code, an atomic part L of code, an atomic part M of code, an atomic part N of code, and an atomic part O of code for a mobile Backend for Frontend. The refactoring recommendation tool calculates a nodes connection score of 1.00 for the connection between the atomic part L of code and the atomic part M of code, a nodes connection score of 0.50 for the connection between the atomic part L of code and the atomic part C of code, and a nodes connection score of 0.00 for each of the connections between the atomic part L of code and the atomic part N of code, and the atomic part O of code. Since the nodes connection score of 0.00 for each of the connections between the atomic part L of code and the atomic part N of code, and the atomic part O of code do not satisfy a nodes connection threshold of 0.125, the refactoring recommendation tool compares the size of the atomic part N of code and its directly connected atomic part O of code against the size of the mobile Backend for Frontend, which results in a relative code size of 29%. %. Since the relative code size of 29% for the atomic part N of code and its directly connected atomic part O of code is greater than a code size threshold of 20%, the refactoring recommendation tool outputs a recommendation to disconnect the atomic part N of code and its directly connected atomic part O of code from the mobile Backend for Frontend, create a new iOS Backend for Frontend, connect the atomic part N of code and its directly connected atomic part O of code to the new iOS Backend for Frontend, and rename the mobile Backend for Frontend as the Android Backend for Frontend. Splitting the microservice into two microservices can reduce complexity, improve source-code maintainability, and enable software developers to develop code more quickly and efficiently by discovering and correcting hidden bugs or vulnerabilities through simplifying the underlying logic and eliminating unnecessary levels of complexity.

Figure 1:
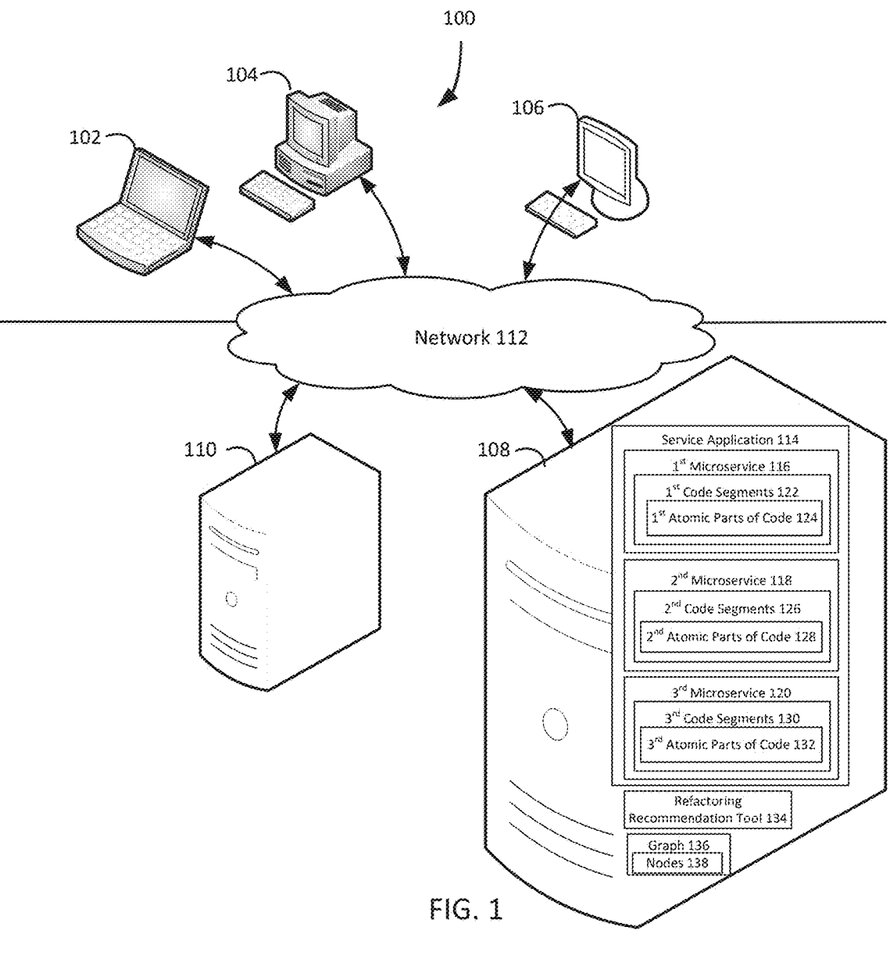
FIG. 1 illustrates a block diagram of an example system for recommending the refactoring of microservices, under an embodiment.

FIG. 1 illustrates a block diagram of a system that implements recommending the refactoring of microservices, under an embodiment. As shown in FIG. 1, system 100 may illustrate a cloud computing environment in which data, applications, services, and other resources are stored and delivered through shared data-centers and appear as a single point of access for the users. The system 100 may also represent any other type of distributed computer network environment in which servers control the storage and distribution of resources and services for different client users.

In an embodiment, the system 100 represents a cloud computing system that includes a first client 102, a second client 104, and a third client 106; and a first server 108 and a second server 110 that may be provided by a hosting company. Although FIG. 1 depicts the first client 102 as a laptop computer 102, the second client 104 as a personal computer 104, and the third client 106 as an Apple® Macintosh computer 106, each of the clients 102-106 may be any type of computer, such as a server. The clients 102-106 and the servers 108-110 communicate via a network 112. Any combination of the servers 108-110 may be any combination of physical computers and virtual machines, or virtual servers. Although FIG. 1 depicts the system 100 with three clients 102-106, two servers 108-110, and one network 112, the system 100 may include any number of clients 102-106, any number of servers 108-110, and any number of networks 112. The clients 102-106 and the servers 108-110 may each be substantially similar to the system 400 depicted in FIG. 4 and described below in reference to FIG. 4.

The first server 108 includes a service application 114 that includes a first microservice 116, a second microservice 118, and a third microservice 120. The first microservice 116 includes first codes segments 122 that include a first atomic part of code 124, the second microservice 118 includes second codes segments 126 that include a second atomic part of code 128, and the third microservice 120 includes third codes segments 130 that include a third atomic part of code 132. The first server 108 also includes a refactoring recommendation tool 134 and a graph 136 that includes connected nodes 138. FIG. 1 depicts the service application 114 and the refactoring recommendation tool 134 residing completely on the first server 108, but the service application 114 and/or the refactoring recommendation tool 134 may reside completely on any of the clients 102-106, completely on the second server 110, or in any combination of partially on the first server 108, partially on the clients 102-106, and partially on the second server 110. The service application 114 and/or the refactoring recommendation tool 134 may provide a plug-in to any of the clients 102-106 and/or the servers 108-110 that enables any of the clients 102-106 and/or the servers 108-110 to execute the service application 114 and/or the refactoring recommendation tool 134.

Figure 2A:
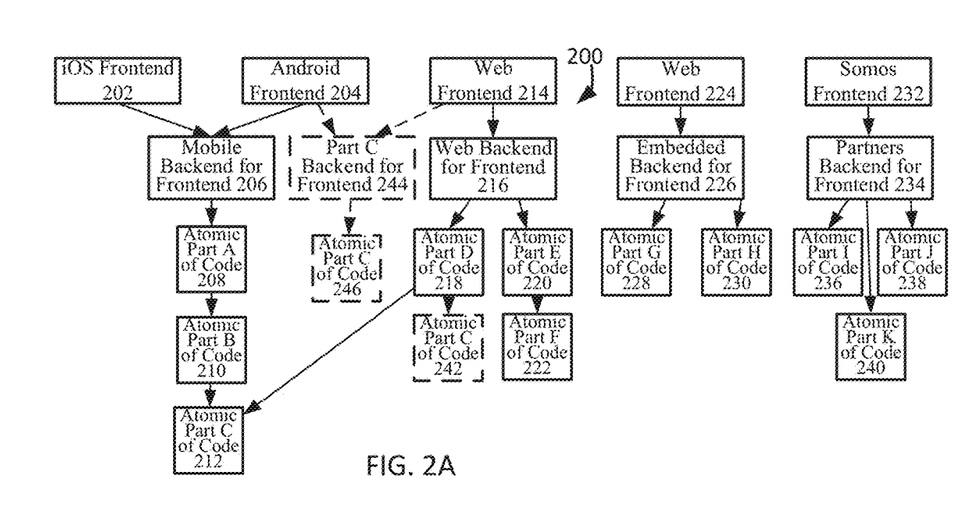
FIGS. 2A-F illustrate example graphs for recommending the refactoring of microservices, under an embodiment

FIGS. 2A-F illustrate example graphs for recommending the refactoring of microservices, under an embodiment. FIG. 2A depicts a graph 200 of the service application 114 that includes an iOS frontend 202, an Android frontend 204, and their corresponding first microservice 116, which is a mobile Backend for Frontend 206. The mobile Backend for Frontend 206 contains the first code segments 122 that include the corresponding first atomic part of code 124, such as an atomic part A of code 208, an atomic part B of code 210, and an atomic part C of code 212. The graph 200 also includes a web frontend 214 and its corresponding second microservice 118, which is a web Backend for Frontend 216. The web Backend for Frontend 216 contains the corresponding second code segments 126 that include the second atomic part of code 128, such as an atomic part D of code 218, an atomic part E of code 220, and an atomic part F of code 222.

The graph 200 further includes a web frontend 224 and its corresponding third microservice 120, which is an embedded Backend for Frontend 226. The embedded Backend for Frontend 226 contains the corresponding third code segments 130 that include the third atomic part of code 132, such as an atomic part G of code 228 and an atomic part H of code 230. The graph 200 additionally includes a Somos frontend 232 and its corresponding microservice, which is a partners Backend for Frontend 234. The partners Backend for Frontend 234 contains code segments that include an atomic part of code, such as an atomic part I of code 236, an atomic part J of code 238, and an atomic part K of code 240. The graph 200 can also include an atomic part C of code 242 for the web Backend for Frontend 216, a part C Backend for Frontend 244, and an atomic part C of code 246 for the part C Backend for Frontend 244.

Microservices can sometimes split due to historical reasons which can change after a while. Additionally, many copy and paste iterations can produce similar microservices. Therefore, if some microservices share enough similar code, these microservices can be merged into one microservice. For example, after the software developer adds the code for the atomic part C of code 242 for the web Backend for Frontend 216, the refactoring recommendation tool 134 uses a diff utility, which is a line-oriented data comparison tool, to identify similarities in large amounts of code that evolved during development cycles. Similar to the Levenshtein-distance algorithm, the diff utility determines the smallest set of deletions and insertions to create one file that is being compared from another file that is being compared. Therefore, the refactoring recommendation tool 134 uses a diff utility to compare code segments for the mobile Backend for Frontend 206 against code segments for the web Backend for Frontend 216. The diff utility's comparison of the code segments that include the atomic part A of code 208, the atomic part B of code 210, the atomic part D of code 218, the atomic part E of code 220, and the atomic part F of code 222 resulted in very low similarity scores that are close to 0.00. However, the diff utility's comparison of the code segments that include the atomic part C of code 212 for the mobile Backend for Frontend 206 against the code segments that include the atomic part C of code 242 for the web Backend for Frontend 216 resulted in a segments similarity score of 0.98. Although these examples use segments similarity scores in the range from 0.00 to 1.00, any range and type of segments similarity score may be used.

An application can be a computer program or piece of software designed and written to fulfill a particular purpose of a user. A microservice can be a loosely coupled service in a software application. A code segment can be a portion of a computer program that contains executable instructions. A segments similarity score can be a number that expresses the resemblance between portions of executable computer instructions.

If none of the segments similarity scores for compared code segments satisfy a segments similarity threshold, the refactoring recommendation tool 134 will not recommend the merging of the microservices that include the compared code segments. A segments similarity threshold can be the magnitude that must be satisfied by a number, which expresses the resemblance between portions of executable computer instructions, for a specific result to occur. Since the segments similarity score of 0.98 for the atomic part C of code 212 and the atomic part C of code 242 satisfies the segments similarity threshold of 0.75, the refactoring recommendation tool 134 determines whether the mobile Backend for Frontend 206 and the web Backend for Frontend 216 share enough similar code segments to justify being merged into a single microservice. Although this example uses a segments similarity threshold in the range from 0.00 to 1.00, any range and type of segments similarity threshold may be used.

Continuing the example, the refactoring recommendation tool 134 compares the size of the identified similar code segments in the mobile Backend for Frontend 206 and the web Backend for Frontend 216 against the sizes of mobile Backend for Frontend 206 and the web Backend for Frontend 216 to determine whether the mobile backend for frontend 206 and the web Backend for Frontend 216 share enough similar code segments to justify being merged into a single microservice. This comparison of the size of the similar code segments to the sizes of their microservices results in microservices similarity scores of 0.33 for the mobile Backend for Frontend 206 and 0.25 for the web Backend for Frontend 216, which indicates that the similar code segments are only 33% of one microservice and 25% of the other microservice. Although these examples use microservices similarity scores in the range from 0.00 to 1.00, any range and type of microservices similarity scores may be used. A size can be the overall dimensions or magnitude of a thing. A microservices similarity score can be a number that expresses the resemblance between loosely coupled services in a software application.

If any of the microservices similarity scores for the microservices satisfy a microservices similarity threshold, the refactoring recommendation tool 134 will recommend the merging of the microservices that include the compared code segments. A microservices similarity threshold can be the magnitude that must be satisfied by a number, which expresses the resemblance between loosely coupled services in a software application, for a specific result to occur. Since neither the microservices similarity score of 0.33 for the mobile Backend for Frontend 206 nor the microservices similarity score of 0.25 for the web Backend for Frontend 216 satisfies the microservices similarity threshold of 0.80, these microservices do not share enough similar code segments to justify being merged into a single microservice. Consequently, the refactoring recommendation tool 134 determines if the similar code segments are sufficiently large to justify being moved by determining whether the size of the similar code segments in the atomic part C of code 212 and the atomic part C of code 242 satisfy a segments size threshold. A segments size threshold can be the magnitude that must be satisfied by a number, which is the overall dimensions or magnitude of a portion of a computer program that contains executable instructions, for a specific result to occur.

If the size of the similar code segments does not satisfy the segments size threshold, the similar segments are too small to justify being moved, and the refactoring recommendation tool 134 can evaluate whether sizes of other similar code segments satisfy the segments size threshold. If the size of the similar code segments satisfies the segments size threshold, the refactoring recommendation tool 134 can output a recommendation to move one set of the similar code segments from one microservice to the other microservice that includes the other set of similar code segments. For example, the refactoring recommendation tool 134 outputs a recommendation to move the atomic part C of code 242 from the web Backend for Frontend 216 to the atomic part C of code 212 for the mobile Backend for Frontend 206 by linking the atomic part D of code 218 to the merged atomic part C of code 212 and deleting the atomic part C of code 242, as depicted by FIG. 2A. A recommendation can be a proposal as to the best course of action.

Alternatively, if the size of the similar code segments satisfies the segments size threshold, the refactoring recommendation tool 134 can output a recommendation to create a new microservice and to move the similar code segments to the new microservice. For example, since the refactoring recommendation tool 134 calculates that only 14% of the code for the mobile Backend for Frontend 206 is dedicated to the atomic part C of code 212, and only 25% of the code for the web Backend for Frontend 216 is dedicated to the atomic part C of code 242, none of the existing microservices is sufficiently dedicated to the similar code segments. Therefore, the refactoring recommendation tool 134 outputs a recommendation to create the part C Backend for Frontend 244, and to move the atomic part C of code 212 from the mobile Backend for Frontend 206 and the atomic part C of code 242 from the web Backend for Frontend 216 to become the atomic part C of code 246 for the part C Backend for Frontend 244. In this situation, the Android frontend 206 and the web frontend 214 would both be linked to the part C Backend for Frontend 244.

Figure 2B:
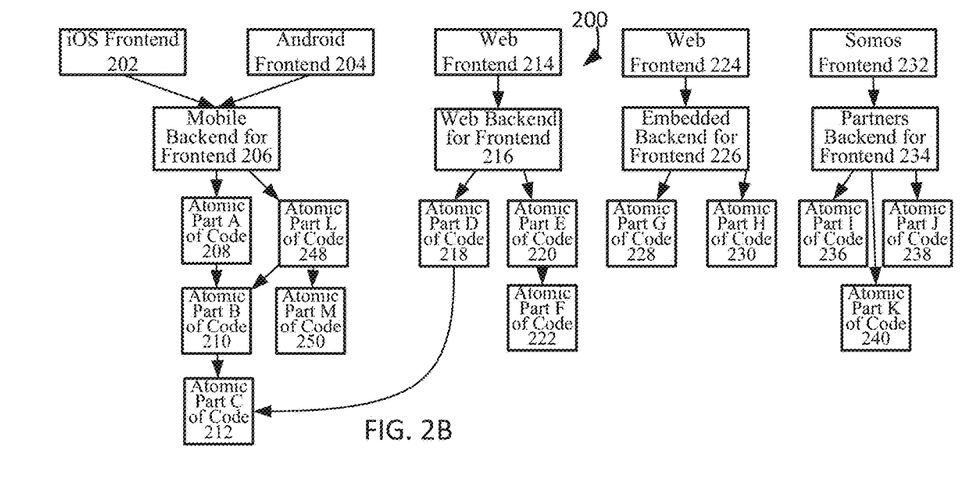
Figure 2C:
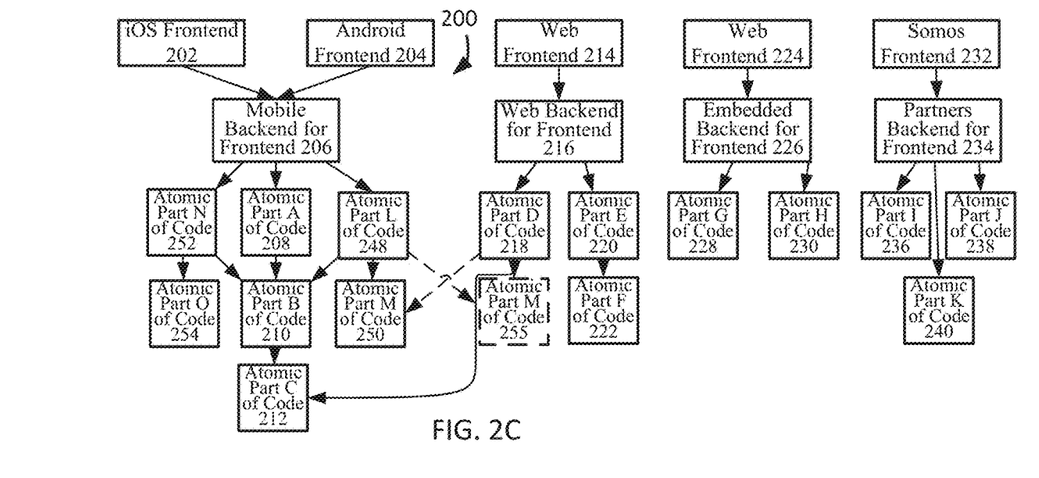

FIG. 2B depicts the graph 200, which indicates that a software developer added an atomic part L of code 248 and an atomic part M of code 250 to the mobile Backend for Frontend 206 to provide additional functionality exclusively for the Android frontend 204. FIG. 2C depicts the graph 200, which indicates that a software developer added an atomic part N of code 252 and an atomic part O of code 254 to the mobile Backend for Frontend 206 to provide additional functionality exclusively for the iOS frontend 202. These example additions of code demonstrate that during the evolution of a microservice, part of the microservice may grow large and complex while other parts of the microservice may remain small or just separate from the large part of the microservice. When two or more parts of a microservice are not strongly connected anymore, splitting the microservice into smaller parts may reduce complexity, improve source-code maintainability, and enable software developers to discover and correct hidden bugs or vulnerabilities by simplifying the underlying logic and eliminating unnecessary levels of complexity. For example, the code that the software developer added to the mobile Backend for Frontend 206 to provide added functionality exclusively for the iOS frontend 202 is very different from the code that the software developer added to the mobile Backend for Frontend 206 to provide added functionality exclusively for the Android frontend 204.

The refactoring recommendation tool 134 can identify such differing code in the mobile Backend for Frontend 206 by using unified modeling language to generate the graph 200 of connected nodes depicted by FIG. 2C, which include nodes that represent the atomic part A of code 208, the atomic part B of code 210, the atomic part C of code 212, the atomic part L of code 248, the atomic part M of code 250, the atomic part N of code 252, and the atomic part O of code 254. A graph can be a diagram representing a system of connections among things. A node can be a point at which lines or pathways intersect or branch. A connected node can be a point at which lines or pathways intersect or branch. An atomic part of code can be a functionally irreducible portion of a computer program that contains executable instructions.

If some parts of a microservice have evolved differently from other parts, an analysis of a graph that represents the parts of the microservice can determine the parts that are disconnected. Alternatively, algorithms such as the Girvan-Newman algorithm can find groups of parts in a graph that are more densely connected, which may be referred to as graph communities, while other groups of parts are sparsely connected. For example, the refactoring recommendation tool 134 uses graph analysis to determine that the flow of the mobile Backend for Frontend 206 which executes the atomic part L of code 248 can subsequently execute the atomic part M of code 250, the atomic part B of code 210, and the atomic part C of code 212, but can never subsequently execute the atomic part A of code 208, the atomic part N of code 252, or the atomic part O of code 254. This graph analysis determines that the atomic part L of code 248 is directly connected to the atomic part M of code 250 and the atomic part B of code 210, is indirectly connected to the atomic part C of code 212, and is disconnected from the atomic part A of code 208, the atomic part N of code 252, and the atomic part O of code 254. Therefore, the refactoring recommendation tool 134 calculates a nodes connection score of 1.00 for the connection between the atomic part L of code 248 and the atomic part M of code 250, calculates a nodes connection score of 0.50 for the connection between the atomic part L of code 248 and the atomic part C of code 212, and calculates a nodes connection score of 0.00 for each of the connections between the atomic part L of code 248 and the atomic part A of code 208, the atomic part N of code 252, and the atomic part O of code 254.

The graph analysis also determines that the flow of the mobile Backend for Frontend 206 which executes the atomic part N of code 252 can subsequently execute the atomic part O of code 254 and the atomic part C of code 212, but can never subsequently execute the atomic part A of code 208, the atomic part L of code 248, or the atomic part M of code 250. This graph analysis determines that the atomic part N of code 252 is directly connected to the atomic part O of code 254 and the atomic part B of code 210, is indirectly connected to the atomic part C of code 212, and is disconnected from the atomic part A of code 208, the atomic part L of code 248, and the atomic part M of code 250. Therefore, the refactoring recommendation tool 134 calculates a nodes connection score of 1.00 for each of the connections between the atomic part N of code 252 and the atomic part O of code 254, and the atomic part B of code 210, calculates a nodes connection score of 0.50 for the connection between the atomic part N of code 252 and the atomic part C of code 212, and calculates a nodes connection score of 0.00 for each of the connections between the atomic part N of code 252 and the atomic part A of code 208, the atomic part L of code 248, and the atomic part M of code 250.

Collectively, the nodes connection scores identify the disconnected parts of a microservice, which indicate that the atomic part A of code 208, the atomic part L of code 248, and the atomic part N of code 252 are the beginnings of three alternative flows for the mobile Backend for Frontend 206, and that the atomic part L of code 248 and the atomic part M of code 250 are disconnected from the atomic part N of code 252 and the atomic part O of code 254. The graph analysis produces nodes connection scores which reflect that the mobile Backend for Frontend 206 executes the atomic part L of code 248 and the atomic part M of code 250 exclusively for the Android frontend 204, and also executes the atomic part N of code 252 and the atomic part O of code 254 exclusively for the iOS frontend 202. A connection can be the way in which multiple objects are linked. A nodes connection score can be a number that expresses the way in which multiple objects are linked. Although these examples use nodes connection scores in the range from 0.00 to 1.00, any range and type of nodes connection scores may be used.

Then the refactoring recommendation tool 134 determines whether each atomic part of code in the mobile Backend for Frontend 206 is sufficiently connected by determining whether each of the nodes connection scores satisfies a nodes connection threshold of 0.125. A nodes connection threshold can be the magnitude that must be satisfied by a number, which expresses the way in which multiple objects are linked, for a specific result to occur. If a nodes connection score satisfies the nodes connection threshold, the corresponding nodes are sufficiently connected, and the refactoring recommendation tool 134 can evaluate whether other nodes connection scores satisfy the nodes connection threshold. However, if a nodes connection score does not satisfy the nodes connection threshold, the corresponding nodes are insufficiently connected, so the refactoring recommendation tool 134 calculates the relative sizes of insufficiently connected nodes to determine whether the insufficiently connected nodes are sufficiently large to justify a split in their microservice.

For example, since each of the atomic part L of code 248 and its directly connected atomic part M of code 250 have an insufficient nodes connection score of 0.0 to each of the atomic part N of code 252 and its directly connected atomic part O of code 254, the refactoring recommendation tool 134 compares the size of the atomic part L of code 248 and its directly connected atomic part M of code 250 against the size of the mobile Backend for Frontend 206, which results in a relative code size of 28%. In another example, since each of the atomic part N of code 252 and its directly connected atomic part O of code 254 have an insufficient nodes connection score of 0.0 to each of the atomic part L of code 248 and its directly connected atomic part M of code 250, the refactoring recommendation tool 134 compares the size of the atomic part N of code 252 and its directly connected atomic part O of code 254 against the size of the mobile Backend for Frontend 206, which results in a relative code size of 29%. A relative code size can be a number that expresses the proportional dimensions or magnitude of a portion of a computer program that contains executable instructions compared to dimensions or magnitude of another portion of the computer program that contains executable instructions. Although these examples use relative code sizes in the range from 0% to 100%, any range and type of relative code sizes may be used.

The refactoring recommendation tool 134 determines whether the insufficiently connected nodes are sufficiently large to justify a split in their microservice by determining whether their relative code size satisfies a code size threshold. In another example, the refactoring recommendation tool 134 compares the relative code size of 28% for the atomic part L of code 248 and its directly connected atomic part M of code 250 against the code size threshold of 20%. In another example, the refactoring recommendation tool 134 compares the relative code size of 29% for the atomic part N of code 252 and its directly connected atomic part O of code 254 against the code size threshold of 20%. A code size threshold can be the magnitude that must be satisfied by a number, which expresses the relative dimensions or magnitude of a portion of a computer program that contains executable instructions, for a specific result to occur. If a relative code size does not satisfy the code size threshold, the refactoring recommendation tool 134 can evaluate whether other relative code sizes satisfy the code size threshold required for recommending a split in a microservice. Although these examples use code size thresholds in the range from 0% to 100%, any range and type of code size thresholds may be used.

Figure 2D:
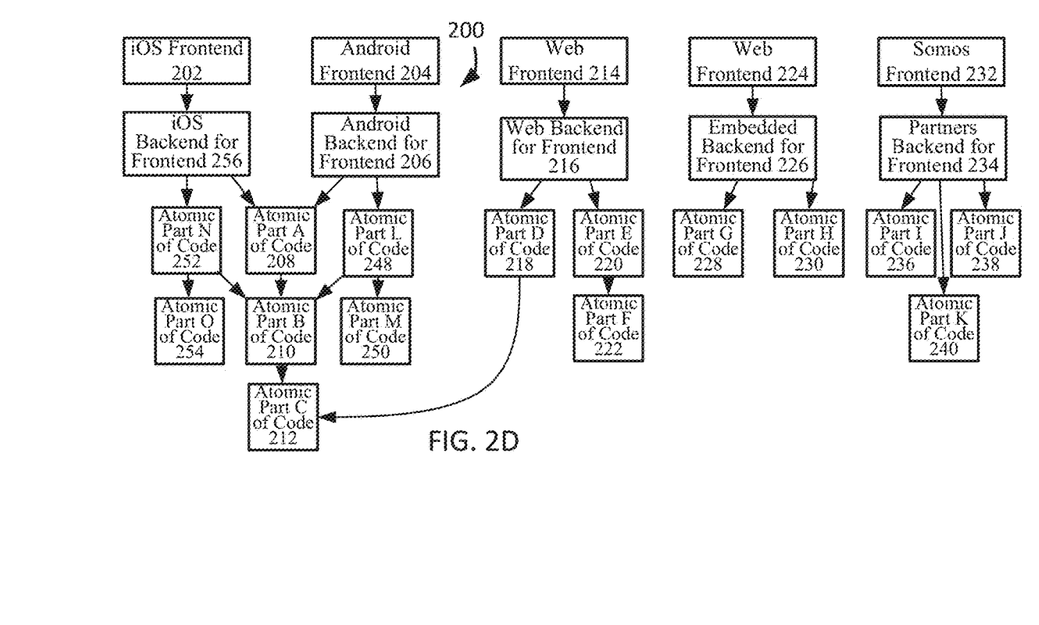

If a relative code size satisfies the code size threshold, the refactoring recommendation tool 134 can output a recommendation to split a microservice by disconnecting any insufficiently connected atomic parts of code from the microservice, creating another microservice in the application, and connecting any disconnected atomic parts of code to the other microservice. For example, since the relative code size of 29% for the atomic part N of code 252 and its directly connected atomic part O of code 254 satisfy the code size threshold of 20%, the refactoring recommendation tool 134 outputs a recommendation to refactor a microservice by splitting the microservice. The recommendation is to disconnect the atomic part N of code 252 and its directly connected atomic part O of code 254 from the mobile Backend for Frontend 206, create a new iOS Backend for Frontend 256, connect the atomic part N of code 252 and its directly connected atomic part O of code 254 to the new iOS Backend for Frontend 256, and rename the mobile Backend for Frontend 206 as the Android Backend for Frontend 206. The recommendation also includes linking the new iOS Backend for Frontend 256 to the atomic part A of code 208, which creates indirect connections to the atomic part B of code 210 and the atomic part C of code 212, as depicted in FIG. 2D. Splitting the microservice into two microservices can reduce complexity, improve source-code maintainability, and enable software developers to develop code more quickly and efficiently by discovering and correcting hidden bugs or vulnerabilities through simplifying the underlying logic and eliminating unnecessary levels of complexity.

FIG. 2D depicts that the Android Backend for Frontend 206 includes the atomic part A of code 208, the atomic part B of code 210, and the atomic part C of code 212 along with the atomic part L of code 248 and the atomic part M of code 250, which are densely connected for the Android frontend 204. Similarly, the new iOS Backend for Frontend 256 includes the atomic part A of code 208, the atomic part B of code 210, and the atomic part C of code 212 along with the atomic part N of code 252 and the atomic part O of code 254, which are densely connected for the iOS frontend 202.

In an alternative example, the graph 200 depicted by FIG. 2C indicates that a software developer added the atomic part N of code 252, the atomic part O of code 254, and the atomic part L of code 248 to the mobile Backend for Frontend 206 to provide additional functionality for both the iOS frontend 202 and the Android frontend 204. The graph 200 depicted by FIG. 2C also indicates that a software developer added the atomic part M of code 250 to the mobile Backend for Frontend 206 to provide additional functionality exclusively for the Android frontend 204 and the web frontend 214. Therefore, the refactoring recommendation tool 134 calculates a nodes connection score of 1.00 for the connection between the atomic part L of code 248 and the atomic part M of code 250, a nodes connection score of 0.00 for the connection between the atomic part N of code 252 and the atomic part M of code 250, and a nodes connection score of 0.00 for the connection between the atomic part O of code 254 and the atomic part M of code 250. The atomic part N of code 252 and its directly connected atomic part O of code 254 each have a nodes connection score of 0.00 for the atomic part M of code 250, which is less than the nodes connection threshold of 0.125.

Therefore, the refactoring recommendation tool 134 determines whether the atomic part M of code 250 is large enough to justify splitting the mobile Backend for Frontend 206 by comparing the size of the atomic part M of code 250 against the size of the mobile Backend for Frontend 206, which results in a relative code size of 14%. Since the relative code size of 14% does not satisfy the code size threshold of 20%, the atomic part M of code 250 is not large enough to justify splitting the mobile Backend for Frontend 206. Consequently, the refactoring recommendation tool 134 determines if the atomic part M of code 250 is sufficiently large to justify being moved by determining whether the relative code size of 14% satisfies the minimal code size threshold of 10%. Since the relative code size of 14% satisfies the minimal code size threshold of 10%, the refactoring recommendation tool 134 determines whether the atomic part M of code 250 is called by an additional microservice.

Since the atomic part M of code 250 is called by the web Backend for Frontend 216, the refactoring recommendation tool 134 determines whether to move the loosely connected atomic part M of code 250 from the mobile Backend for Frontend 206 to the calling web Backend for Frontend 216. The refactoring recommendation tool 134 can determine whether such a move is justified by evaluating whether the mobile Backend for Frontend 206 is more dedicated to the loosely connected atomic part M of code 250 than the calling web Backend for Frontend 216 would be dedicated to a moved version of the connected atomic part M of code 250. The refactoring recommendation tool 134 evaluates each microservice's dedication to the code that may be moved by calculating the dedication of the mobile Backend for Frontend 206 to the loosely connected atomic part M of code 250 as the relative code size of 0.14, and calculating the dedication of the web Backend for Frontend 216 to a moved version of the atomic part M of code 250 as the relative code size of 0.25. Since a significantly greater percentage of the web Backend for Frontend 216 would be dedicated to a moved version of the atomic part M of code 250 than the percentage of the mobile Backend for Frontend 206 that is currently dedicated to the atomic part M of code 250, the move of the atomic part M of code 250 to the web Backend for Frontend 216 is justified.

Therefore, the refactoring recommendation tool 134 outputs a recommendation to move the atomic part M of code 250 to the web Backend for Frontend 216, thereby becoming the moved atomic part M of code 255, and to add a link that enables the mobile Backend for Frontend 206 to call the moved atomic part M of code 255. A minimal code size threshold can be the magnitude that must be satisfied by a number, which expresses the relative dimensions or magnitude of a portion of a computer program that, contains executable instructions, for a specific result to occur. Although these examples use a minimal code size threshold in the range from 0% to 100%, any range and type of minimal code size threshold may be used.

Figure 2E:
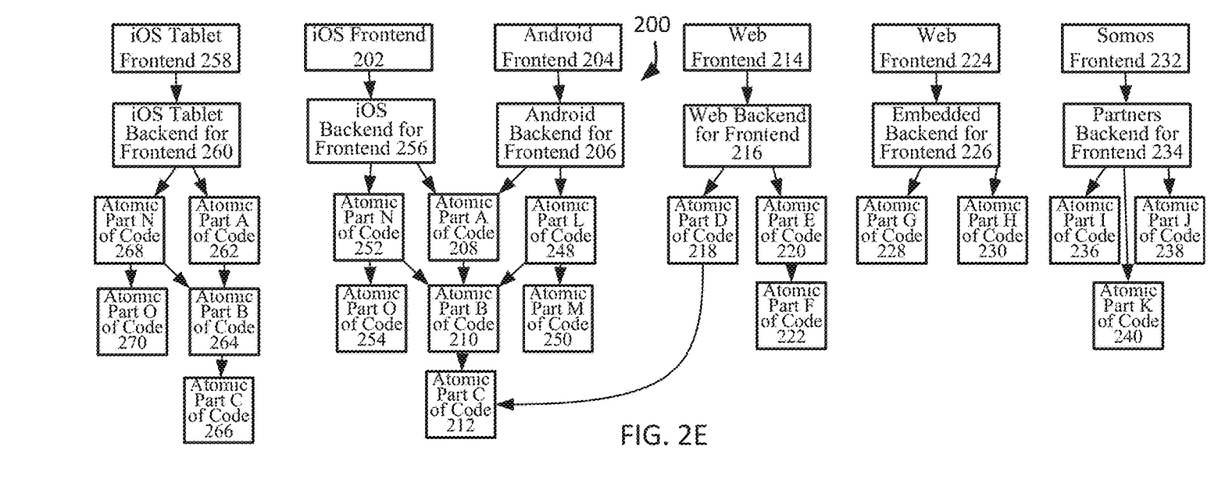

FIG. 2E depicts the graph 200, which indicates that a software developer received a new request to support the iOS tablet in addition to supporting the iOS mobile device. From past experience the software developer decides to add an iOS tablet frontend 258 and code that is structured as its corresponding microservice, an iOS tablet Backend for Frontend 260. The iOS tablet Backend for Frontend 260 contains code segments that include at least one corresponding atomic part of code, such as an atomic part A of code 262, an atomic part B of code 264, an atomic part C of code 266, an atomic part N of code 268, and an atomic part O of code 270.

After the software developer adds the code for an iOS tablet, the refactoring recommendation tool 134 uses a diff utility to compare all code segments for all microservices, including the code segments for the iOS Tablet Backend for Frontend 260 against code segments for the application's iOS Backend for Frontend 256, which results in a segments similarity score of 0.98. If the segments similarity score of does not satisfy a segments similarity threshold, the refactoring recommendation tool 134 will not recommend the merging of the microservices that include the compared code segments. Since the segments similarity score of 0.98 satisfies the segments similarity threshold of 0.75, the refactoring recommendation tool 134 determines whether the iOS Tablet Backend for Frontend 260 and the iOS Backend for Frontend 256 share enough similar code segments to be merged into a single microservice. For example, the refactoring recommendation tool 134 compares the size of the similar code segments in the iOS Tablet Backend for Frontend 260 and the iOS Backend for Frontend 256 against the sizes of the iOS Tablet Backend for Frontend 260 and the iOS Backend for Frontend 256, which results in microservices similarity scores of 1.00 for the iOS Tablet Backend for Frontend 260 and 1.00 for the iOS Backend for Frontend 256.

Although this example describes calculating the same microservices similarity scores for each microservice, the refactoring recommendation tool 134 can calculate different microservices similarity scores for each microservice, and then use the different scores to determine how the microservices are merged. In an alternative example, the refactoring recommendation tool 134 compares the size of similar code in the iOS Tablet Backend for Frontend 260 and the mobile Backend for Frontend 206 against the sizes of the iOS Tablet Backend for Frontend 260 and the mobile Backend for Frontend 206 to calculate a microservices similarity score of 1.00 for the iOS Tablet Backend for Frontend 260 and calculate a microservices similarity score of 0.71 for the mobile Backend for Frontend 206. Continuing this alternative example, the refactoring recommendation tool 134 recommends merging the iOS Tablet Backend for Frontend 260 into the mobile Backend for Frontend 206 because the similar code segments comprise all of the code in the iOS Tablet Backend for Frontend 260 but comprise only a portion of the code in the mobile Backend for Frontend 206.

Figure 2F:
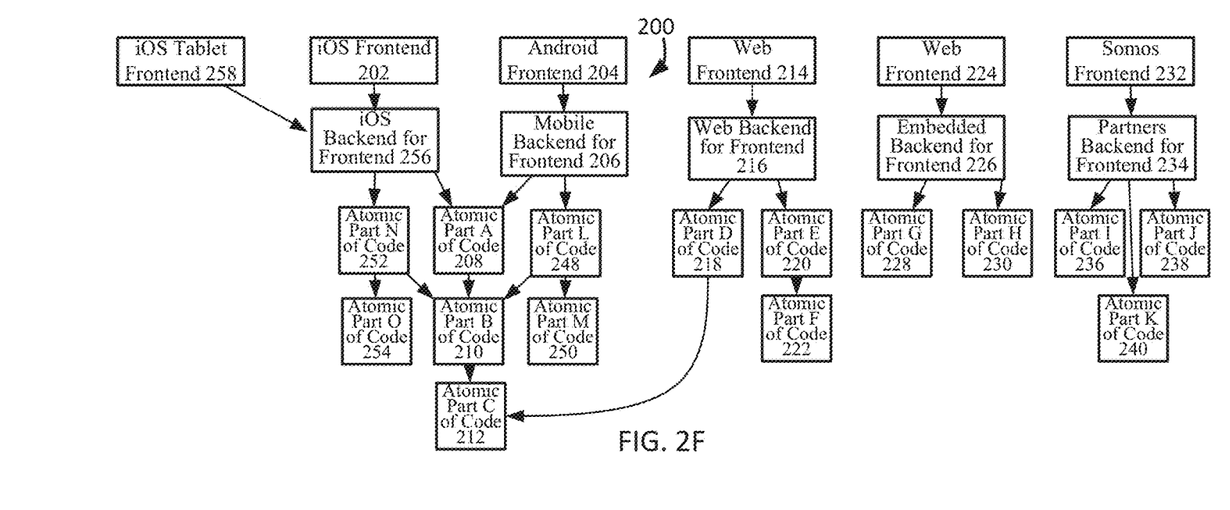

If each of the microservices similarity scores for the microservices do not satisfy a microservices similarity threshold, the refactoring recommendation tool 134 will not recommend the merging of the micro services that include the compared code segments. Since the microservices similarity score of 1.00 for the iOS Tablet Backend for Frontend 260 satisfies the microservices similarity threshold of 0.80, the refactoring recommendation tool 134 outputs a recommendation to merge the iOS Tablet Backend for Frontend 260 into the iOS Backend for Frontend 256. Merging microservices reduces memory requirements for the application, which reduces operational expenses. Merging can be combining to form a single entity. FIG. 2F depicts the graph 200, which indicates that a software developer merged the iOS Tablet Backend for Frontend 260 into the iOS Backend for Frontend 256, thereby deleting the duplicated atomic parts of code, such as the atomic part A of code 262, the atomic part B of code 264, the atomic part C of code 266, the atomic part N of code 268, and the atomic part O of code 270.

Figure 3A:
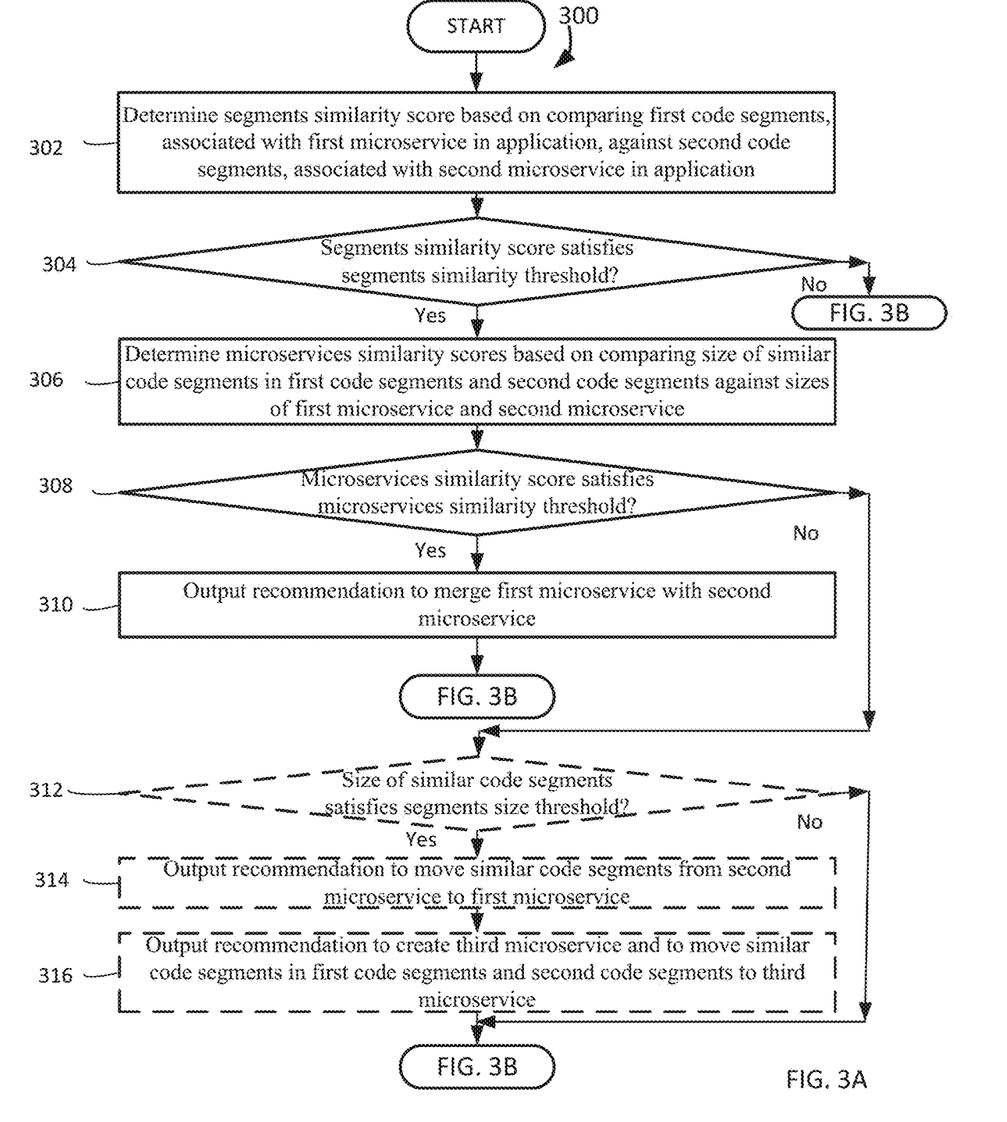
FIGS. 3A-B depict a flowchart that illustrates a method for recommending the refactoring of microservices, under an embodiment.
Figure 3B:
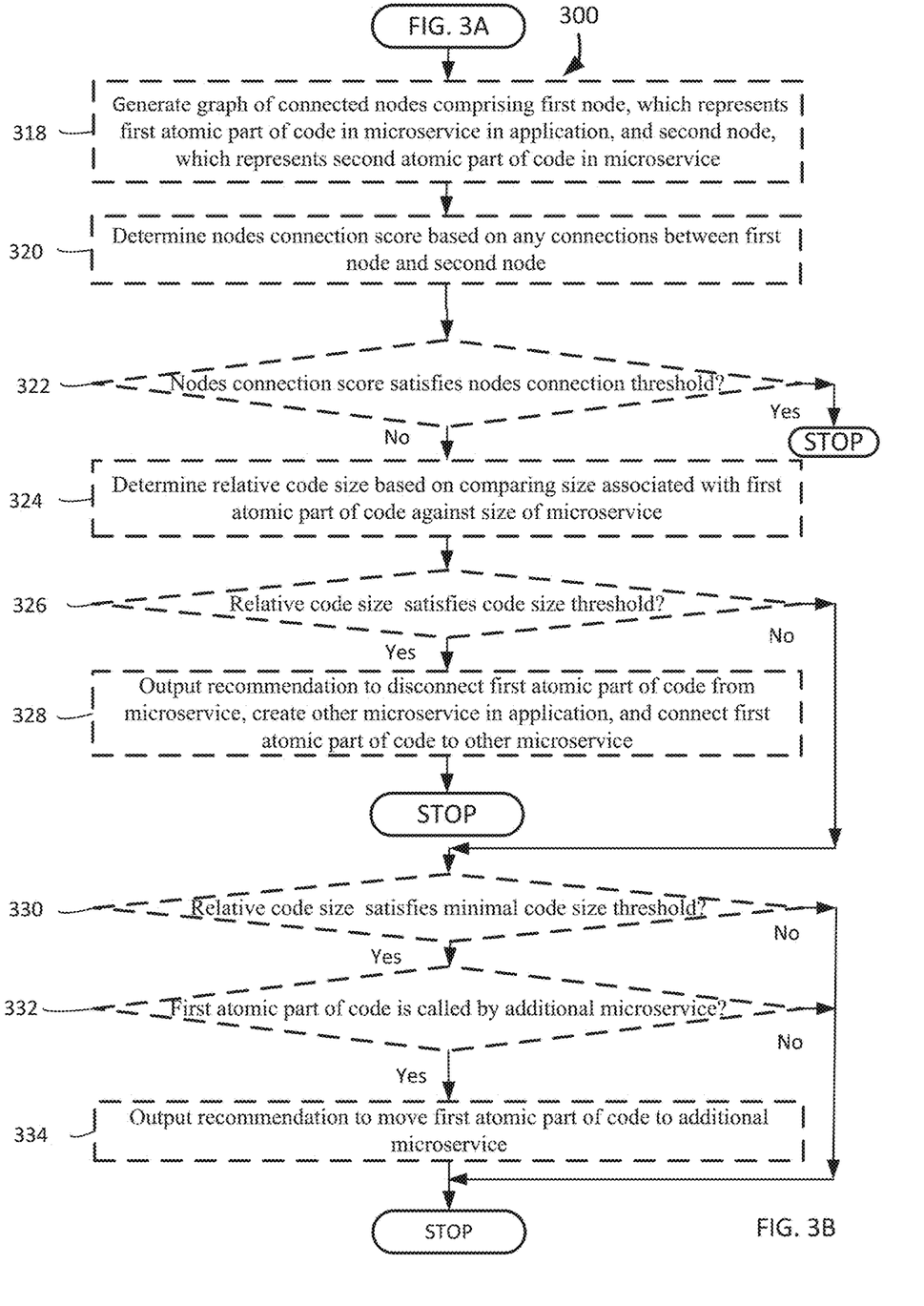

FIGS. 3A-B depict a flowchart that illustrates a method for recommending the refactoring of microservices, under an embodiment. Flowchart 300 illustrates method acts illustrated as flowchart blocks for certain steps involved in and/or between the clients 102-106 and/or the servers 108-110 of FIG. 1.

A segments similarity score is optionally determined based on comparing first code segments, associated with a first microservice in an application, against second code segments, associated with a second microservice in the application, block 302. The system can search for similar code segments in different microservices. For example, and without limitation, this can include the refactoring recommendation tool 134 using a diff utility to compare code segments for the iOS Tablet Backend for Frontend 260 against code segments for the application's iOS Backend for Frontend 256, which results in a segments similarity score of 0.98.

After calculating a segments similarity score, a determination is optionally made whether the segments similarity score satisfies a segments similarity threshold. block 304. The system can determine whether code segments are sufficiently similar for merging. By way of example and without limitation, this can include the refactoring recommendation tool 134 determining whether the segments similarity score of 0.98 satisfies the segments similarity threshold of 0.75. If the segments similarity score satisfies the segments similarity threshold, then the method 300 continues to block 304 to evaluate the relative sizes of the similar code segments. If the segments similarity score does not satisfy the segments similarity threshold, the method 300 proceeds to FIG. 3B to evaluate whether any microservices should be split.

If a segments similarity score satisfies a segments similarity threshold, microservices similarity scores are optionally determined based on comparing a size of similar code segments in the first code segments and the second code segments against sizes of the first microservice and the second microservice, block 306. The system can determine the sizes of the similar code segments relative to the sizes of their microservices. In embodiments, this can include the refactoring recommendation tool 134 comparing the sizes of the similar code segments in the iOS Tablet Backend for Frontend 260 and the iOS Backend for Frontend 256 against the sizes of the iOS Tablet Backend for Frontend 260 and the iOS Backend for Frontend 256, which results in microservices similarity scores of 1.00 for the iOS Tablet Backend for Frontend 260 and 1.00 for the iOS Backend for Frontend 256.

Following the calculation of microservices similarity scores, a determination is optionally made whether any microservices similarity score satisfies a microservice similarity threshold, block 308. The system can determine whether the similar code segments are large enough for merging their microservices. For example, and without limitation, this can include the refactoring recommendation tool 134 determining whether the microservices similarity score of 1.00 for the iOS Tablet Backend for Frontend 260 satisfies the microservices similarity threshold of 0.80. If any microservices similarity score satisfies the microservices similarity threshold, then the method 300 continues to block 310 to recommend the merging of the microservices with the similar code segments. If no microservices similarity score satisfies the microservices similarity threshold, the method 300 proceeds to block 312 to evaluate whether any microservices should be moved.

If any microservices similarity score satisfies the microservices similarity threshold, a recommendation to merge the first microservice with the second microservice is optionally output, block 310. The system can recommend merging microservices with large amounts of similar code. By way of example and without limitation, this can include the refactoring recommendation tool 134 outputting a recommendation to merge the iOS Tablet Backend for Frontend 260 into the iOS Backend for Frontend 256, because the microservices similarity score of 1.00 for the iOS Tablet Backend for Frontend 260 satisfies the microservices similarity threshold of 0.80. Then the method 300 proceeds to FIG. 3B to evaluate whether any microservices should be split.

If no microservices similarity score satisfies a microservices similarity threshold, a determination is optionally made whether the size of similar code segments satisfies a segments size threshold, block 312. The system can determine if the similar code segments are sufficiently large to be moved. In embodiments, this can include the refactoring recommendation tool 134 determining whether the size of similar code segments in the atomic part C of code 212 and the atomic part C of code 242 satisfies the segments size threshold.

If the size of similar code segments satisfies a segments size threshold, a recommendation is optionally output to move the similar code segments from the second microservice to the first microservice, block 314. The system can recommend moving sufficiently large and similar code segments. For example, and without limitation, this can include the refactoring recommendation tool 134 outputting a recommendation to move the atomic part C of code 242 from the web Backend for Frontend 216 to the atomic part C of code 212 for the mobile Backend for Frontend 206, by linking the atomic part D of code 218 to the merged atomic part C of code 212 and deleting the atomic part C of code 242, as depicted by FIG. 2C.

If the size of similar code segments satisfies a segments size threshold, a recommendation is optionally output to create a third microservice and to move the similar code segments in the first code segments and the second code segments to the third microservice, block 316. The system can recommend moving sufficiently large and similar code segments. By way of example and without limitation, this can include the refactoring recommendation tool 134 outputting a recommendation to create the part C Backend for Frontend 244, and to move the atomic part C of code 212 from the mobile Backend for Frontend 206 and the atomic part C of code 242 from the web Backend for Frontend 216 to become the atomic part C of code 242 for the part C Backend for Frontend 244. Then the method 300 proceeds to FIG. 3B to evaluate whether any microservices should be split.

In addition to optionally recommending the merging of microservices that have sufficiently large and similar code segments, a graph of connected nodes is generated, comprising a first node, which represents a first atomic part of code in a microservice in the application, and a second node, which represents a second atomic part of code in the microservice, block 318. The system generates graphs to identify microservices that should be split. In embodiments, this can include the refactoring recommendation tool 134 using unified modeling language to generate the graph of connected nodes depicted by FIG. 2C, which include nodes that represent the atomic part A of code 208, the atomic part B of code 210, the atomic part C of code 212, the atomic part L of code 248, the atomic part M of code 250, the atomic part N of code 252, and the atomic part O of code 254 for the mobile Backend for Frontend 206.

After a graph is generated, a nodes connection score is determined based on any connections between the first node and the second node, block 320. The system evaluates the connections between parts of microservices. For example, and without limitation, this can include the refactoring recommendation tool 134 calculating a nodes connection score of 1.00 for the connection between the atomic part L of code 248 and the atomic part M of code 250, calculating a nodes connection score of 0.50 for the connection between the atomic part L of code 248 and the atomic part C of code 212, and calculating a nodes connection score of 0.00 for each of the connections between the atomic part L of code 248 and the atomic part A of code 208, the atomic part N of code 252, and the atomic part O of code 254.

Following the calculation of the nodes connection score, a determination is made whether the nodes connection score satisfies a nodes connection threshold, block 322. The system identifies loosely connected parts of microservices. By way of example and without limitation, this can include the refactoring recommendation tool 134 determining whether each atomic part of code in the mobile Backend for Frontend 206 is sufficiently connected by determining whether each of their nodes connection scores satisfies a nodes connection threshold of 0.125. If a nodes connection score does not satisfy a nodes connection threshold, the method 300 continues to block 324 to calculate the relative size of the corresponding atomic part of the code. If a nodes connection score satisfies a nodes connection threshold, the refactoring recommendation tool 134 stops if no other nodes connection scores remain to be evaluated.

If a nodes connection score does not satisfy a nodes connection threshold, a relative code size is determined based on comparing a size associated with the first atomic part of code against the size of the microservice, block 324. The system determines the relative sizes of loosely connected parts of microservices. In embodiments, this can include the refactoring recommendation tool 134 comparing the size of the atomic part N of code 252 and its directly connected atomic part O of code 254 against the size of the mobile Backend for Frontend 206, which results in a relative code size of 29%.

Having calculated a relative code size, a determination is made whether the relative code size satisfies a code size threshold, block 326. The system determines whether the loosely connected parts of microservices are large enough to justify splitting a microservice. For example, and without limitation, this can include the refactoring recommendation tool 134 comparing the relative code size of 29% for the atomic part N of code 252 and its directly connected atomic part O of code 254 against the code size threshold of 20%. If the relative code size satisfies the code size threshold, the method 300 continues to block 328 to recommend the splitting of a microservice. If the relative code size does not satisfy the code size threshold, the method 300 proceeds to block 330 to evaluate whether the corresponding atomic part of code is large enough to be moved.

If a relative code size satisfies a code size threshold, a recommendation is made to disconnect the first atomic part of code from the microservice, create another microservice in the application, and connect the first atomic part of code to the other microservice, block 328. The system recommends the splitting of microservices. By way of example and without limitation, this can include the refactoring recommendation tool 134 outputting a recommendation to disconnect the atomic part N of code 252 and its directly connected atomic part O of code 254 from the mobile Backend for Frontend 206, create a new iOS Backend for Frontend 256, connect the atomic part N of code 252 and its directly connected atomic part O of code 254 to the new iOS Backend for Frontend 256, and rename the mobile Backend for Frontend 206 as the Android Backend for Frontend 206. Then the method 300 stops. Splitting the microservice into two microservices can reduce complexity, improve source-code maintainability, and enable software developers to develop code more quickly and efficiently by discovering and correcting hidden bugs or vulnerabilities through simplifying the underlying logic and eliminating unnecessary levels of complexity.

If a relative code size does not satisfy a code size threshold, a determination is optionally made whether the relative code size satisfies a minimal code size threshold, block 330. The system can determine whether small loosely connected parts of a microservice are still large enough to be moved. In embodiments, this can include the refactoring recommendation tool 134 determining whether the relative code size of 14% satisfies the minimal code size threshold of 10%. If the relative code size satisfies the minimal code size threshold, the method 300 continues to block 332 to determine whether the corresponding atomic part of code is called by another microservice. If the relative code size does not satisfy the minimal code size threshold, the method 300 stops.

If a relative code size satisfies a minimal code size threshold, a determination is optionally made whether the first atomic part of code is called by an additional microservice, block 332. The system can determine whether loosely connected parts of a microservice are called by another microservice. For example, and without limitation, this can include the refactoring recommendation tool 134 determining whether the atomic part M of code 250 is called by an additional microservice. If the first atomic part of code is called by an additional microservice, the method 300 continues to block 334 to recommend moving the corresponding atomic part of code. If the first atomic part of code is not called by an additional microservice, the method 300 stops.

If the first atomic part of code is called by an additional microservice, a recommendation is optionally output to move the first atomic part of code to the additional microservice, block 334. The system can recommend moving loosely connected parts of a microservice to a calling microservice. For example, and without limitation, this can include the refactoring recommendation tool 134 outputting a recommendation to move the atomic part M of code 250 to the web Backend for Frontend 216, which calls the atomic part M of code 250.

Although FIG. 3 depicts the blocks 302-334 occurring in a specific order, the blocks 302-334 may occur in another order. In other implementations, each of the blocks 302-334 may also be executed in combination with other blocks and/or some blocks may be divided into a different set of blocks.

Figure 4:
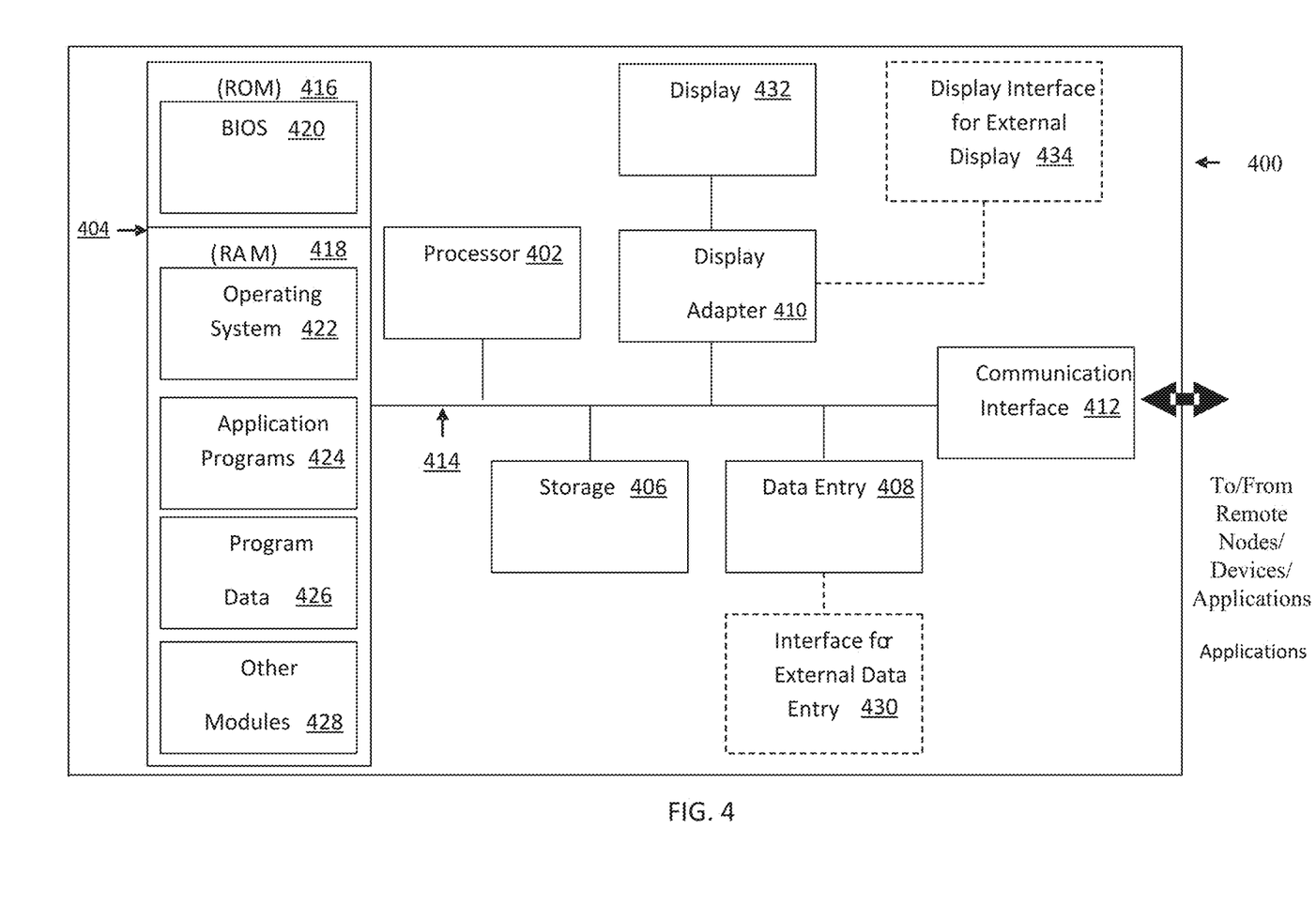
FIG. 4 is a block diagram illustrating an example hardware device in which the subject matter may be implemented.

Having described the subject matter in detail, an exemplary hardware device in which the subject matter may be implemented shall be described. Those of ordinary skill in the art will appreciate that the elements illustrated in FIG. 4 may vary depending on the system implementation. With reference to FIG. 4, an exemplary system for implementing the subject matter disclosed herein includes a hardware device 400, including a processing unit 402, memory 404, storage 406, data entry module 408, display adapter 410, communication interface 412, and a bus 414 that couples elements 404-412 to the processing unit 402.

The bus 414 may comprise any type of bus architecture. Examples include a memory bus, a peripheral bus, a local bus, etc. The processing unit 402 is an instruction execution machine, apparatus, or device and may comprise a microprocessor, a digital signal processor, a graphics processing unit, an application specific integrated circuit (ASIC), a field programmable gate array (FPGA), etc. The processing unit 402 may be configured to execute program instructions stored in memory 404 and/or storage 406 and/or received via data entry module 408.

The memory 404 may include read only memory (ROM) 416 and random access memory (RAM) 418. Memory 404 may be configured to store program instructions and data during operation of device 400. In various embodiments, memory 404 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAM-BUS DRAM (RDRAM), for example. Memory 404 may also include nonvolatile memory technologies such as nonvolatile flash RAM (NVRAM) or ROM. In some embodiments, it is contemplated that memory 404 may include a combination of technologies such as the foregoing, as well as other technologies not specifically mentioned. When the subject matter is implemented in a computer system, a basic input/output system (BIOS) 420, containing the basic routines that help to transfer information between elements within the computer system, such as during start-up, is stored in ROM 416.

The storage 406 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 400.

It is noted that the methods described herein may be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 406, ROM 416 or RAM 418, including an operating system 422, one or more applications programs 424, program data 426, and other program modules 428. A user may enter commands and information into the hardware device 400 through data entry module 408. Data entry module 408 may include mechanisms such as a keyboard, a touch screen, a pointing device, etc. Other external input devices (not shown) are connected to the hardware device 400 via external data entry interface 430. By way of example and not limitation, external input devices may include a microphone, joystick, game pad, satellite dish, scanner, or the like. In some embodiments, external input devices may include video or audio input devices such as a video camera, a still camera, etc. Data entry module 408 may be configured to receive input from one or more users of device 400 and to deliver such input to processing unit 402 and/or memory 404 via bus 414.

A display 432 is also connected to the bus 414 via display adapter 410. Display 432 may be configured to display output of device 400 to one or more users. In some embodiments, a given device such as a touch screen, for example, may function as both data entry module 408 and display 432. External display devices may also be connected to the bus 414 via external display interface 434. Other peripheral output devices, not shown, such as speakers and printers, may be connected to the hardware device 400.

The hardware device 400 may operate in a networked environment using logical connections to one or more remote nodes (not shown) via communication interface 412. The remote node may be another computer, a server, a router, a peer device or other common network node, and typically includes many or all of the elements described above relative to the hardware device 400. The communication interface 412 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 412 may include logic configured to support direct memory access (DMA) transfers between memory 404 and other devices.

In a networked environment, program modules depicted relative to the hardware device 400, or portions thereof, may be stored in a remote storage device, such as, for example, on a server. It will be appreciated that other hardware and/or software to establish a communications link between the hardware device 400 and other devices may be used.

It should be understood that the arrangement of hardware device 400 illustrated in FIG. 4 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) may be realized, in whole or in part, by at least some of the components illustrated in the arrangement of hardware device 400.

In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 4.

Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the preceding description, the subject matter was described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the preceding context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A system comprising:
one or more processors; and
a non-transitory computer readable medium storing a plurality of instructions, which when executed, cause the one or more processors to:
generate a graph of connected nodes comprising a first node, which represents a first atomic part of code in a microservice in an application, and a second node, which represents a second atomic part of code in the microservice;
determine a nodes connection score based on any connections between the first node and the second node;
determine whether the nodes connection score satisfies a nodes connection threshold;
determine a relative code size based on comparing a size associated with the first atomic part of code against a size of the microservice, in response to a determination that the nodes connection score does not satisfy the nodes connection threshold;
determine whether the relative code size satisfies a code size threshold; and output a recommendation to disconnect the first atomic part of code from the microservice, create another microservice in the application, and connect the first atomic part of code to the other microservice, in response to a determination that the relative code size satisfies the code size threshold.

2. The system of claim 1, wherein the plurality of instructions further causes the processor to
determine whether the relative code size satisfies a minimal code size threshold, in response to a determination that the relative code size does not satisfy the code size threshold;
determine whether the first atomic part of code is called by an additional microservice, in response to a determination that the relative code size does not satisfy the minimal code size threshold; and
output a recommendation to move the first atomic part of code to the additional microservice, in response to a determination that the first atomic part of code is called by the additional microservice.

3. The system of claim 1, wherein the plurality of instructions further causes the processor to:
determine a segments similarity score based on comparing first code segments, associated with a first microservice in the application, against second code segments, associated with a second microservice in the application;
determine whether the segments similarity score satisfies a segments similarity threshold;
determine microservices similarity scores based on comparing a size of similar code segments in the first code segments and the second code segments against sizes of the first microservice and the second microservice, in response to a determination that the segments similarity score satisfies the segments similarity threshold:
determine whether any microservices similarity score satisfies a microservices similarity threshold; and
output a recommendation to merge the first microservice with the second microservice, in response to a determination that any microservices similarity score satisfies the microservices similarity threshold.

4. The system of claim 3, wherein the plurality of instructions further causes the processor to determine whether the size of similar code segments satisfies a segments size threshold, in response to a determination that not any microservices similarity scores satisfy the microservices similarity threshold.

5. The system of claim 4, wherein the plurality of instructions further causes the processor to output a recommendation to move the similar code segments from the second microservice to the first microservice, in response to a determination that the size of similar code segments satisfies the segments size threshold.

6. The system of claim 5, wherein moving the similar code segments from the second microservice to the first microservice comprises linking the second microservice to the similar code segments in the first microservice and deleting the similar code segments from the second microservice.

7. The system of claim 4, wherein the plurality of instructions further causes the processor to output a recommendation to create a third microservice and to move the similar code segments in the first code segments and the second code segments to the third microservice, in response to a determination that the size of the similar code segments satisfies the segments size threshold.

8. A method comprising:
generating a graph of connected nodes comprising a first node, which represents a first atomic part of code in a microservice in an application, and a second node, which represents a second atomic part of code in the microservice;
determining a nodes connection score based on any connections between the first node and the second node;
determining whether the nodes connection score satisfies a nodes connection threshold;
determining a relative code size based on comparing a size associated with the first atomic part of code against a size of the microservice, in response to a determination that the nodes connection score does not satisfy the nodes connection threshold;
determining whether the relative code size satisfies a code size threshold; and
outputting a recommendation to disconnect the first atomic part of code from the microservice, create another microservice in the application, and connect the first atomic part of code to the other microservice, in response to a determination that the relative code size satisfies the code size threshold.

9. The method of claim 8, wherein the computer-implemented method further comprises:
determining whether the relative code size satisfies a minimal code size threshold, in response to a determination that the relative code size does not satisfy the code size threshold;
determining whether the first atomic part of code is called by an additional microservice, in response to a determination that the relative code size does not satisfy the minimal code size threshold; and
outputting a recommendation to move the first atomic part of code to the additional microservice, in response to a determination that the first atomic part of code is called by the additional microservice.

10. The method of claim 8, wherein the computer-implemented method further comprises:
determining a segments similarity score based on comparing first code segments, associated with a first microservice in the application, against second code segments, associated with a second microservice in the application;
determining whether the segments similarity score satisfies a segments similarity threshold;
determining microservices similarity scores based on comparing a size of similar code segments in the first code segments and the second code segments against sizes of the first microservice and the second microservice, in response to a determination that the segments similarity score satisfies the segments similarity threshold:
determining whether any microservices similarity score satisfies a microservices similarity threshold; and
outputting a recommendation to merge the first microservice with the second microservice, in response to a determination that any microservices similarity score satisfies the microservices similarity threshold.

11. The method of claim 10, wherein the computer-implemented method further comprises determining whether the size of similar code segments satisfies a segments size threshold, in response to a determination that not any microservices similarity scores satisfy the microservices similarity threshold.

12. The method of claim 11, wherein the computer-implemented method further comprises outputting a recommendation to move the similar code segments from the second microservice to the first microservice, in response to a determination that the size of similar code segments satisfies the segments size threshold.

13. The method of claim 12, wherein moving the similar code segments from the second microservice to the first microservice comprises linking the second microservice to the similar code segments in the first microservice and deleting the similar code segments from the second microservice.

14. The method of claim 11, wherein the computer-implemented method further comprises outputting a recommendation to create a third microservice and to move the similar code segments in the first code segments and the second code segments to the third microservice, in response to a determination that the size of the similar code segments satisfies the segments size threshold.

15. A computer program product, comprising a non-transitory computer-readable medium having a computer-readable program code embodied therein to be executed by one or more processors, the program code including instructions to:
   generate a graph of connected nodes comprising a first node, which represents a first atomic part of code in a microservice in an application, and a second node, which represents a second atomic part of code in the microservice;
   determine a nodes connection score based on any connections between the first node and the second node;
   determine whether the nodes connection score satisfies a nodes connection threshold;
   determine a relative code size based on comparing a size associated with the first atomic part of code against a size of the microservice, in response to a determination that the nodes connection score does not satisfy the nodes connection threshold;
   determine whether the relative code size satisfies a code size threshold; and
   output a recommendation to disconnect the first atomic part of code from the microservice, create another microservice in the application, and connect the first atomic part of code to the other microservice, in response to a determination that the relative code size satisfies the code size threshold.

16. The computer program product of claim 15, wherein the program code includes further instructions to:
   determine whether the relative code size satisfies a minimal code size threshold, in response to a determination that the relative code size does not satisfy the code size threshold;
   determine whether the first atomic part of code is called by an additional microservice, in response to a determination that the relative code size does not satisfy the minimal code size threshold; and
   output a recommendation to move the first atomic part of code to the additional microservice, in response to a determination that the first atomic part of code is called by the additional microservice.

17. The computer program product of claim 15, wherein the program code includes further instructions to:
   determine a segments similarity score based on comparing first code segments, associated with a first microservice in the application, against second code segments, associated with a second microservice in the application;
   determine whether the segments similarity score satisfies a segments similarity threshold;
   determine microservices similarity scores based on comparing a size of similar code segments in the first code segments and the second code segments against sizes of the first microservice and the second microservice, in response to a determination that the segments similarity score satisfies the segments similarity threshold:
   determine whether any microservices similarity score satisfies a microservices similarity threshold; and
   output a recommendation to merge the first microservice with the second microservice, in response to a determination that any microservices similarity score satisfies the microservices similarity threshold.

18. The computer program product of claim 17, wherein the program code includes further instructions to determine whether the size of similar code segments satisfies a segments size threshold, in response to a determination that not any microservices similarity scores satisfy the microservices similarity threshold.

19. The computer program product of claim 18, wherein the program code includes further instructions to output a recommendation to move the similar code segments from the second microservice to the first microservice, wherein moving the similar code segments from the second microservice to the first microservice comprises linking the second microservice to the similar code segments in the first microservice and deleting the similar code segments from the second microservice, in response to a determination that the size of similar code segments satisfies the segments size threshold.

20. The computer program product of claim 18, wherein the program code includes further instructions to output a recommendation to create a third microservice and to move the similar code segments in the first code segments and the second code segments to the third microservice, in response to a determination that the size of the similar code segments satisfies the segments size threshold.

* * * * *